US011725871B2

(12) United States Patent
Root (10) Patent No.: US 11,725,871 B2
(45) Date of Patent: Aug. 15, 2023

(54) APPLIANCE WITH PRESENCE DETECTION SYSTEM

(71) Applicant: Haier US Appliance Solutions, Inc., Wilmington, DE (US)

(72) Inventor: Steven Keith Root, Buckner, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 125 days.

(21) Appl. No.: 17/483,864

(22) Filed: Sep. 24, 2021

(65) Prior Publication Data

US 2023/0098486 A1 Mar. 30, 2023

(51) Int. Cl.
*F25D 23/12* (2006.01)
*G01V 8/26* (2006.01)

(52) U.S. Cl.
CPC ............. *F25D 23/126* (2013.01); *G01V 8/26* (2013.01); *F25D 2700/04* (2013.01)

(58) Field of Classification Search
CPC ...... F25D 23/126; F25D 2700/04; G01V 8/26
See application file for complete search history.

(56) References Cited

U.S. PATENT DOCUMENTS

| 6,789,585 | B1 | 9/2004 | Janke | |
|---|---|---|---|---|
| 7,743,801 | B2 | 6/2010 | Janardhanam | |
| 9,739,517 | B2 | 8/2017 | Root | |
| 9,795,010 | B2 | 10/2017 | Kendall | |
| 2013/0228250 | A1* | 9/2013 | Agam | G01S 15/87 141/83 |
| 2017/0010034 | A1* | 1/2017 | Doering | F25C 5/22 |
| 2017/0051963 | A1* | 2/2017 | Root | F25C 5/22 |
| 2018/0335248 | A1* | 11/2018 | Root | B67D 1/124 |

FOREIGN PATENT DOCUMENTS

WO WO2017026133 A1 2/2017

* cited by examiner

*Primary Examiner* — Emmanuel E Duke
(74) *Attorney, Agent, or Firm* — Dority & Manning, P.A.

(57) ABSTRACT

An appliance including a control device in operative communication with a user input panel and a sensor provided. The control device is configured to emit, via the sensor, a first plurality of signals defining a first operating mode. The first operating mode includes one or more of a first scan rate or a first scan interval. The control device is configured to switch between the first operating mode and a second operating mode based on one or more of detection of a container, detection of a user, or a user input. The control device is configured to emit, via the sensor, a second plurality of signals defining the second operating mode. The second operating mode includes one or more of a second scan rate or a second scan interval different from the first operating mode.

20 Claims, 8 Drawing Sheets

APPLIANCE WITH PRESENCE DETECTION SYSTEM

FIELD

The present disclosure relates generally to systems and methods for detecting presence of a user near an appliance.

BACKGROUND

Appliances, such as refrigerator appliances, generally include one or more cabinets defining chambers for the receipt of food items for storage. Appliances may also include features for dispensing fluids, such as ice and/or liquid water. To provide ice and/or liquid water, a dispenser is typically positioned on a door of the appliance. The user positions a container proximate the dispenser, and ice and/or liquid water are deposited into the container depending upon the user's selection. A paddle or other type switch may be provided whereby the user may make a selection. Typically, the liquid water is chilled by routing the liquid water through one of the refrigerated chambers.

It is desirable to sense the presence of a person near an appliance and trigger a response associated with that presence. Known presence sensors suffer from drawbacks, including limited range and complexity or size of packaging with the appliance. While an appliance may include one or more types of sensors for different functions, there is a need for improved structures and methods for presence detection.

BRIEF DESCRIPTION

Aspects and advantages of the invention will be set forth in part in the following description, or may be obvious from the description, or may be learned through practice of the invention.

The present subject matter provides an appliance including a dispenser including a nozzle for dispensing a fluid. A sensor is configured to emit and receive one or more signals indicative of a distance from the sensor. One or more control devices is in operative communication with a user input panel, the dispenser and the sensor. The one or more control devices is configured to emit from the sensor a first plurality of signals defining a first operating mode. The first operating mode includes one or more of a first scan rate or a first scan interval. The one or more control devices is configured to switch between the first operating mode and a second operating mode based on one or more of detection of a container, detection of a user, or a user input. The one or more control devices is configured to emit from the sensor a second plurality of signals defining the second operating mode. The second operating mode includes one or more of a second scan rate or a second scan interval.

The present subject matter also provides a controller for an appliance. The controller includes one or more memory devices configured to store instructions that, when executed by one or more processors, causes the controller to perform operations. The operations include emitting, from a sensor, a first plurality of signals defining a first operating mode, wherein the first operating mode includes one or more of a first scan rate or a first scan interval; switching between the first operating mode and a second operating mode based on one or more of detection of a container, detection of a user, or a user input; and emitting, from the sensor, a second plurality of signals defining the second operating mode, wherein the second operating mode includes one or more of a second scan rate or a second scan interval.

Variations and modifications may be made to these example embodiments of the present disclosure. These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment may be used with another embodiment to yield a still further embodiment. Thus, it is intended that the present invention covers such modifications and variations as come within the scope of the appended claims and their equivalents.

Example aspects of the present disclosure are directed to appliances with features for presence detection and dispensing fluid and related methods. More particularly, a sensor associated with a dispensing system may be configured to detect a presence of a user in a first operating mode and detect a container in a second operating mode. Particular embodiments may utilize the same sensor for user presence detection and container detection, auto-fill, or liquid dispensing modes. The sensor may further be configured to determine a height of the container and/or a level of contents within the container. In example embodiments, the sensor may be an ultrasonic sensor or light sensor positioned on an upper portion of the dispensing system, such that the sensor transmits signals parallel to the liquid water stream dispensed by the dispenser in a second operating mode. The appliance may include a pivoting sensor array to change a field of view for the first operating mode (i.e., the presence detection mode) or an articulating plate configured to deflect the sensor signal outside of the dispenser. The first operating mode includes one or more of a first scan rate, a first scan interval, or a first scan range different from a second scan rate, a second scan interval, or a second scan range of the second operating mode. The different operating modes allow for resolution and timely detection of the presence of a user, a container, and fluids in contrast to the range, resolution, or timing required to detection of a user. It will be appreciated by those skilled in the art that the dispenser may be configured to dispense various other suitable forms of liquid instead of or in addition to liquid water without deviating from the scope of the present disclosure. Various embodiments of the appliance may particularly form a refrigerator appliance. However, it should be appreciated that other embodiments of the appliance and method provided herein may be included at other appliances.

Once the user has been detected in the presence detection mode, one or more user experience functions may be activated. Such functions may include, but are not limited to, providing light, activating a display, displaying a font, sending a signal to another computing device (e.g., smartphone or computer), or other desired user experience function. Once a container has been detected at the dispenser, the operating mode of the appliance may change (i.e., to the second operating mode) to allow for desired timing and resolution of the fluid dispenser, any automated functions, or height determining functions. When the container has been removed, the appliance may return to the presence detection mode (i.e., first operating mode).

Particular advantages may include utilizing the same sensor for both operating modes, allowing for reduced complexity, cost, and reduced packaging space at the appliance. Furthermore, particular embodiments of the method for control may allow the same sensor to provide presence detection at a greater scan range while also providing sampling, resolution, and appropriate range for container detection. Such improved functions may be provided while avoiding costly or complex changes in the sensor.

Figure 1:
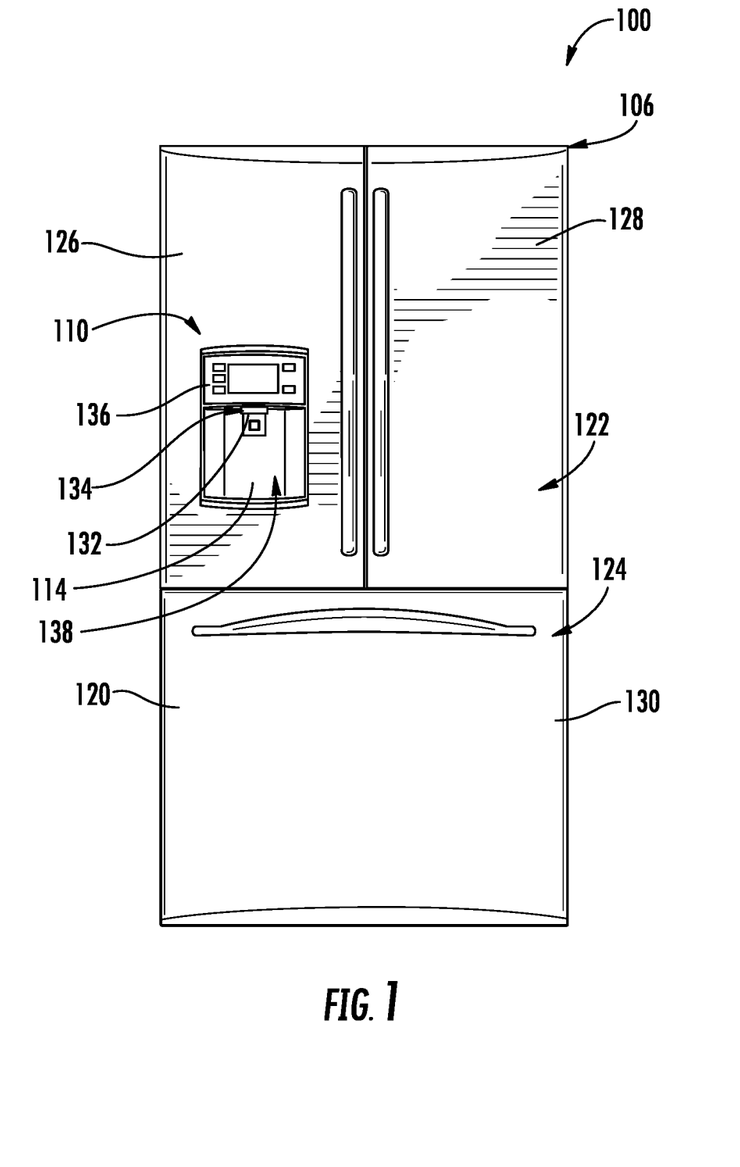
FIG. 1 provides a front, elevation view of an appliance in accordance with aspects of the present disclosure.

Referring now to the figures, FIG. 1 depicts a front view of an example embodiment of an appliance 100. The appliance 100 may particularly form a refrigerator appliance. The appliance 100 may include a cabinet or housing 120 defining an upper fresh food chamber 122 and a lower freezer chamber 124 arranged below the fresh food chamber 122. As such, appliance 100 may generally be referred to as a bottom-mount refrigerator appliance. In the exemplary embodiment, housing 120 also defines a mechanical compartment (not shown) for receipt of a sealed cooling system. Using the teachings disclosed herein, one of skill in the art will understand that the present disclosure may be used with other types of refrigerator appliances (e.g., side-by-sides or top-mounts), freezer appliances, dishwashing appliances, clothes washing appliances, dryers, ovens or stoves, fluid dispensers generally, or other appropriate appliances. Consequently, the description set forth herein is for illustrative purposes only and is not intended to limit the invention to any particular style or arrangement of appliance.

Refrigerator doors 126, 128 are rotatably hinged to an edge of housing 120 for accessing fresh food compartment 122. A freezer door 130 is arranged below refrigerator doors 126, 128 for accessing freezer chamber 124. In the exemplary embodiment, freezer door 130 is coupled to a freezer drawer (not shown) slidably mounted within freezer chamber 124.

Appliance 100 includes a dispensing assembly 110 for dispensing liquid water and ice. Dispensing assembly 110 includes a dispenser 114 positioned on an exterior portion of appliance 100. Dispenser 114 includes a discharging outlet 134 for accessing ice and liquid water. Dispensing assembly 110 further includes a sensor 112 positioned on discharging outlet 134. As will be described in more detail below, sensor 112 may be configured to detect a presence of a container positioned within dispensing assembly 110, and to detect the top lip of the container. A user interface panel 136 is provided for controlling the mode of operation. For example, user interface panel 136 includes a water dispensing button (not labeled) and an ice-dispensing button (not labeled) for selecting a desired mode of operation such as crushed, non-crushed ice, or liquid water, etc.

Discharging outlet 134 is an external part of dispenser 114, and is mounted in a dispensing recess or recessed portion 138 defined in an outside surface of refrigerator door 126. Recessed portion 138 is positioned at a predetermined elevation convenient for a user to access ice or liquid water and enabling the user to access ice or liquid water without the need to bend-over and without the need to access freezer chamber 124. In the exemplary embodiment, recessed portion 138 is positioned at a level that approximates the chest level of a user.

Operation of the appliance 100 is regulated by a control device or controller 300 that is operatively coupled to user interface panel 136 and/or sensor 112. The controller 300 may include one or more processors 314 and one or more memory devices 316. The one or more memory devices 316 may be configured to store instructions that, when executed by the one or more processors 314, causes the appliance 100 to perform operations such as provided below. The memory device(s) 316 may be configured to data corresponding to one or more signals, functions, charts, tables, schedules, or determined values such as provided herein.

Panel 136 provides selections for user manipulation of the operation of appliance 100 such as e.g., selections between whole or crushed ice, chilled liquid water, and/or other options. In response to user manipulation of the user interface panel 136, the controller 300 operates various components of the appliance 100. The controller 300 may be positioned in a variety of locations throughout appliance 100. In the illustrated embodiment shown in FIG. 1, the controller 300 is located within or beneath the user interface panel 136 on door 126. In such an embodiment, input/output ("I/O") signals may be routed between controller 300 and various operational components of appliance 100. In one exemplary embodiment, the user interface panel 136 may represent a general purpose I/O ("GPIO") device or functional block. In another exemplary embodiment, the user interface 136 may include input components, such as one or more of a variety of electrical, mechanical or electromechanical input devices including rotary dials, push buttons, and touch pads. The user interface 136 may be in communication with the controller 300 via one or more signal lines or shared communication busses.

Figure 2A:
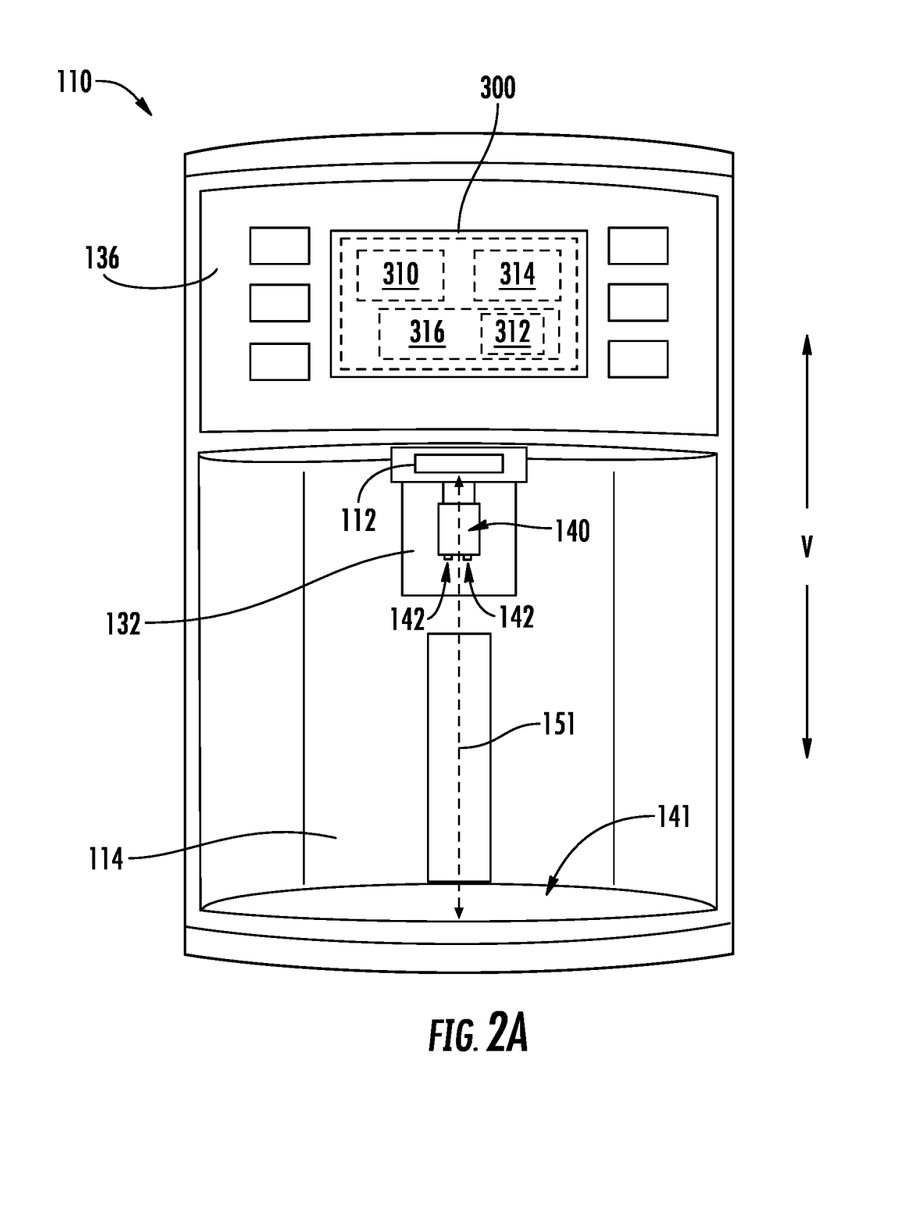
FIGS. 2A-2B provide front, elevation views of an embodiment of a dispensing assembly of the example appliance of FIG. 1.
Figure 2B:
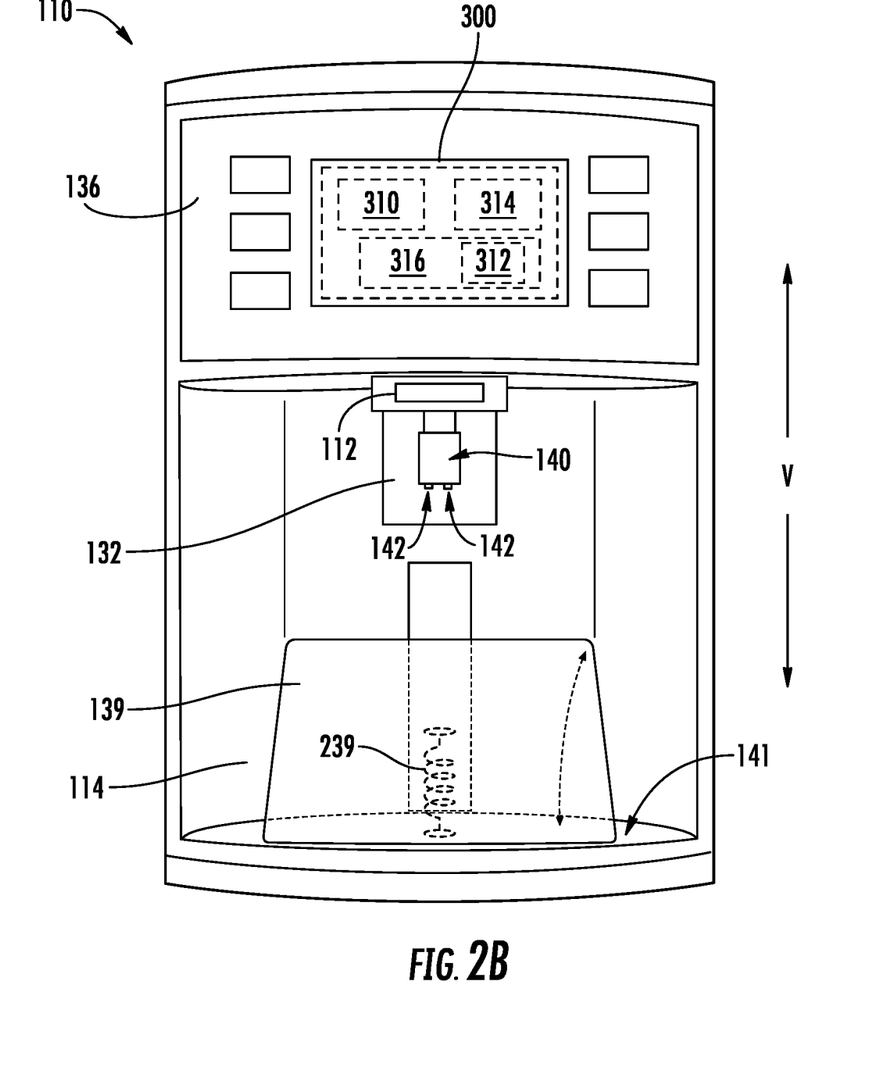
Figure 3:
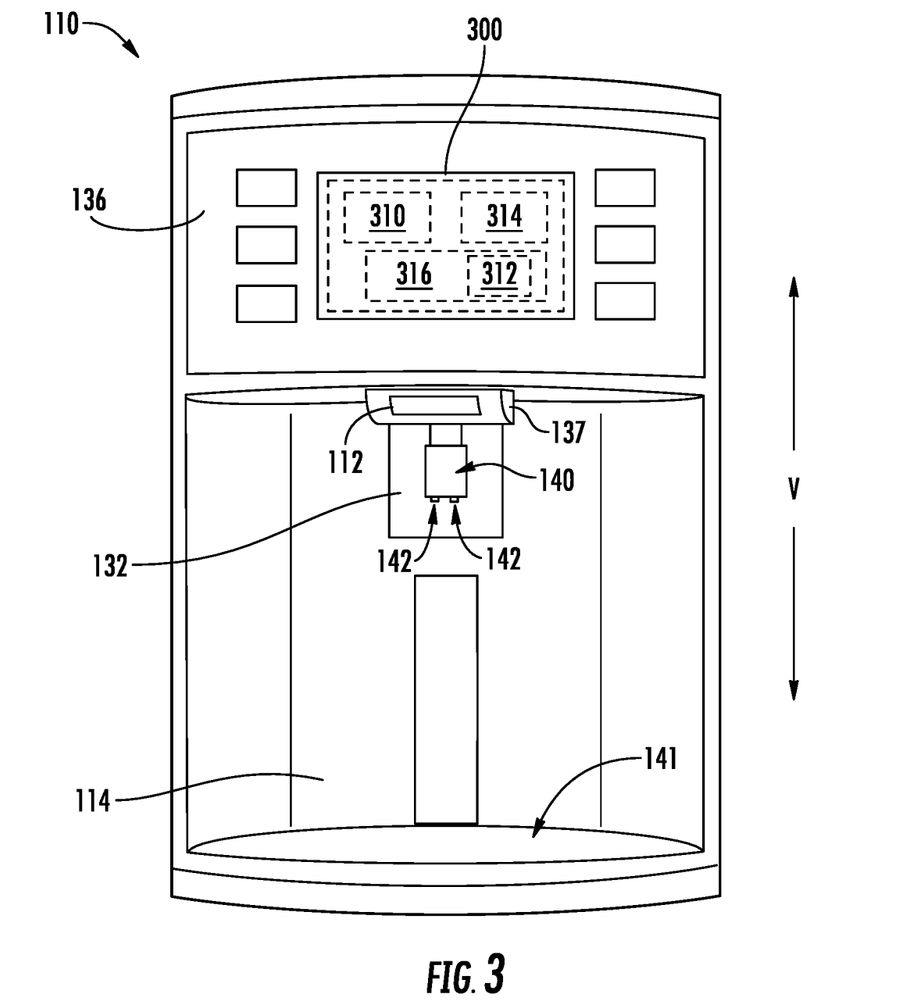
FIG. 3 provides front, elevation views of an embodiment of a dispensing assembly of the example appliance of FIG. 1.

FIGS. 2-3 provide a close-up front view of embodiments of the dispenser 114 of dispensing assembly 110. An exemplary nozzle 140 is positioned adjacent to an activation member 132. Nozzle 140 includes a plurality of fluid outlets 142 through which liquid water may flow into a container placed into the recess 138 of dispensing assembly 110 by a user of appliance 100. Dispensing assembly 110 may further include a sensor, such as sensor 112. Sensor 112 may be positioned above nozzle 140 within dispenser 114. In particular, sensor 112 may be positioned within an upper portion of dispenser 114. In certain operating modes, such as further described herein, one or more signals generated by sensor 112 are transmitted parallel to the liquid water stream.

In this manner, sensor 112 may be positioned vertically above a container placed in dispenser 114.

In example embodiments, sensor 112 may be an ultrasonic transducer configured to periodically transmit and receive high frequency sound waves, and to convert the received sound waves into electrical data. In particular, sensor 112 may be configured to generate and transmit a sound wave, and to receive one or more echoed sound waves. Sensor 112 may further be configured to determine a time interval between transmitting the sound wave and receiving the one or more echoes. It will be appreciated that various other sensors and/or sensor configurations may be used, such as for instance, a sensor configuration including a separate and distinct transmitter and receiver.

In another embodiment, sensor 112 may be a light transducer, such as, but not limited to, an infrared light sensor, a visible light sensor, or a camera. The sensor 112 configured as a light transducer may be configured to periodically transmit and receive light and to convert the received light into electrical data. In particular, sensor 112 may be configured to generate and transmit light and to receive reflected light. Sensor 112 may further be configured to determine a time interval between transmitting the light and receiving the reflected light. It will be appreciated that various other sensors and/or sensor configurations may be used, such as for instance, a sensor configuration including a separate and distinct transmitter and receiver.

Referring to FIGS. 2-3, the controller 300 is in operative communication with one or more of the panel 136, the dispenser 114, and the sensor 112. The controller 300 is configured to emit from the sensor 112 a first plurality of signals 151 defining a first operating mode. The first operating mode corresponds to a user presence detection mode during which a scan range of the sensor 112 is configured to emit and receive signals beyond the dispenser 114. The first operating mode includes one or more of a first field of view or first scan range, a first sampling rate or first scan rate, a first sampling interval or first scan interval, or combinations thereof. In some embodiments, the first scan range is a function of one or more of the first scan rate or the first scan interval. When in the first operating mode, the appliance 100 may emit and receive signals from beyond the dispenser 114 and perform one or more operations based on the detection of a user. Example embodiments of such operations may include, but are not limited to, activating lights, displays, or providing information at the panel 136 when the user is detected (i.e., when signals corresponding to beyond the dispenser 114 are received by the sensor 112).

The controller 300 is configured to detect a container (i.e., the presence thereof) within the dispensing recess 138 based at least in part on the one or more signals from the sensor 112. In a particular embodiment, the controller 300 is configured to detect the container within the dispensing recess 138 based at least in part on receiving the first plurality of signals 151 and the second plurality of signals 152. The controller 300 is configured to determine a proximity of the received signals. When the sensor 112 detects that the distance of the received signal is within a threshold range, the received signal corresponds the proximity of the received signals to detection of the presence of the container at the dispensing recess 138. When the presence of the container is detected, the controller 300 is configured to emit from the sensor 112 a second plurality of signals 152 defining a second operating mode. The second operating mode corresponds to a container presence detection mode, during which the appliance 100 may dispense a fluid (e.g., liquid water or ice), detect a level or height of contents in the container, or perform another function based on the presence of the container at the dispensing recess 138. The second operating mode includes one or more of a second field of view or second scan range, a second sampling rate or second scan rate, a second sampling interval or second scan interval, or combinations thereof different from the first operating mode. In some embodiments, the second scan range is a function of one or more of the second scan rate or the second scan interval.

The change in operating modes at the sensor 112 may particularly allow for a single or common sensor to receive signals that are adequate for detecting fluid levels, performing automatic fluid dispensing, or terminating fluid dispensing (e.g., the second operating mode), while also allowing for increased field of view to detect a user in a room or area from the appliance 100. In various embodiments, the threshold between the second scan range and the first scan range corresponds approximately to a height or depth of the dispensing recess 138. In certain embodiments, the height of the dispensing recess 138 is approximately a distance from the sensor 112 to a drip tray 141 located distal to the sensor 112 along a vertical direction. The distance from the sensor 112 to the drip tray 141 may correspond to the threshold between the second scan range and the first scan range. The second scan range is greater than zero inches and less than the threshold, and the first scan range is greater than the threshold. Accordingly, the second scan range corresponding to detection of the container at the dispensing recess 138 is less than the first scan range corresponding to detection of the user around the appliance 100.

In certain embodiments, the change in operating modes at the sensor 112 includes the first scan interval of at least approximately 2 times greater than the second scan interval. In another embodiment, the change in operating modes at the sensor 112 includes the first scan interval of approximately 4 times greater than the second scan interval. The decrease in scan interval from the first operating mode to the second operating mode decreases the scan range and increases the resolution, such as may allow for sensing of fluid levels in the container, dispensing fluids based on the sensed fluid level, and terminating dispensation of fluids without spillage overflow, or excess. The increase in scan interval from the second operating mode to the first operating mode increases the scan range to allow for sensing when a user is in a room or area around the refrigeration device. While the resolution may decrease from the second operating mode to the first operating mode, the resolution is sufficient for detection of a user in the room or area around the appliance 100 in contrast to the resolution for detecting fluid levels at the container.

In an example embodiment, the threshold is greater than approximately 12 inches and less than approximately 14 inches. In a particular embodiment, the threshold is approximately 13.6 inches. As provided above, the controller 300 may be configured to determine a proximity of the received signals 151, 152. The controller 300 may further be configured to compare a rate of change of the proximity of the received signals 151 152. In example embodiments, the controller 300 may be configured to anticipate a transition from the second operating mode to the first operating mode based on the rate of change of the proximity of the received signals 151, 152. As the distance of the received signal decreases toward the threshold, the controller 300 may anticipate the change from the second operating mode to the first operating mode, such as to decrease or eliminate a lag between changes in operating modes.

The appliance 100 may be configured to change an angle of emission of the second plurality of signals relative to the first plurality of signals. In particular embodiments, the appliance 100 is configured to change the angle of the second plurality of signals when the presence of the container is detected. In various embodiments, the appliance 100 directs the first plurality of signals 151 outside of the dispensing recess 138 and directs or re-directs the second plurality of signals 152 within the dispensing recess 138, such as vertically straight downward toward a container.

Referring to FIG. 2B, in one embodiment, the appliance 100 includes an articulating plate 139 positioned at the dispensing recess 138. In a particular embodiment, the articulating plate 139 is positioned at a drip tray 141. The articulating plate 139 includes an actuation structure 239 configured to pivot the articulating plate 139. The actuation structure 239 allows the articulating plate 139 to pivot at a pivot member 241 to an angle relative to a bottom portion of the dispensing recess 138 (e.g., the drip tray 141). The actuation structure 239 may include a spring, an actuator configured to extend and retract based on the operating mode, or other appropriate mechanical or electro-mechanical actuating mechanism. The actuation structure 239 may include a retainer device configured to keep the articulating plate 139 in a retracted position while in the second operating mode and release the articulating plate 139 into the angled position when in the first operating mode. In certain embodiments, the actuation structure 239 is configured to pivot the articulating plate 139 from approximately 0 degrees up to approximately 90 degrees. In some embodiments, the actuation structure 239 is configured to pivot the articulating plate 139 between 0 degrees and approximately 45 degrees. The 0 degrees position may be substantially flat relative to the bottom portion of the dispensing recess 138. The approximately 0 degree position may correspond to the second operating mode, at which a container (e.g., container 111 depicted in FIG. 5) may be positioned onto the articulating plate 139. Any one or more positions greater than 0 degrees, such as 45 degrees, or up to approximately 90 degrees, corresponds to the first operating mode.

The articulating plate 139 may change an angle of emission of the second plurality of signals relative to the first plurality of signals by pivoting the articulating plate 139 from the angled position in the first operating mode to the approximately 0 degree position in the second operating mode. The first plurality of signals 151 emitted from the sensor 112 may deflect from the articulating plate 139 outside of the dispensing recess 138. The reflected signals received by the sensor 112 may detect a user (i.e., the presence of a user) around the appliance 100. In a user presence detection mode, such as the first operating mode, the articulating plate 139 may reflect the signal perpendicular, or substantially perpendicular, from the appliance 100 or relative to emission of the signal from the sensor 112 toward the articulating plate 139.

In one embodiment, a user may place a container onto the articulating plate 139 to position the articulating plate 139 in the 0 degree position. The plurality of signals from the sensor 112 may contact the articulating plate 139, or the container, and reflect back to the sensor 112. In another embodiment, as the received signals indicate a rate of change of proximity of the signals indicative of a change from the first operating mode to the second operating mode, the actuation device 239 may be configured to retract the articulating plate 139 to the 0 degree position.

Figure 4A:
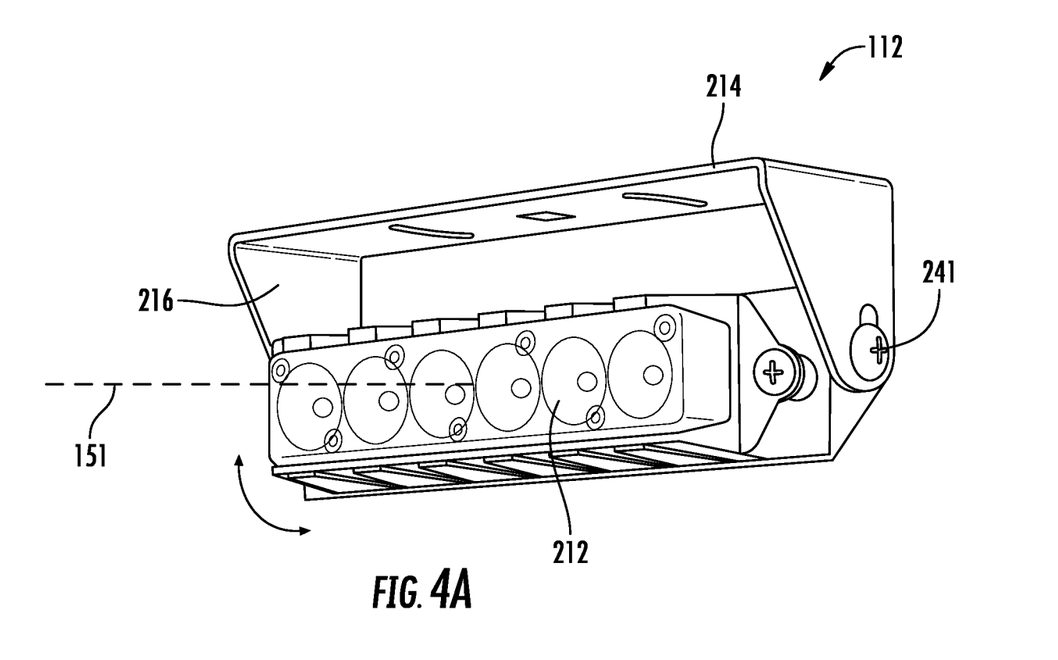
FIGS. 4A-4B provide perspective views of an embodiment of a sensor of the appliance in accordance with aspects of the present disclosure.
Figure 4B:
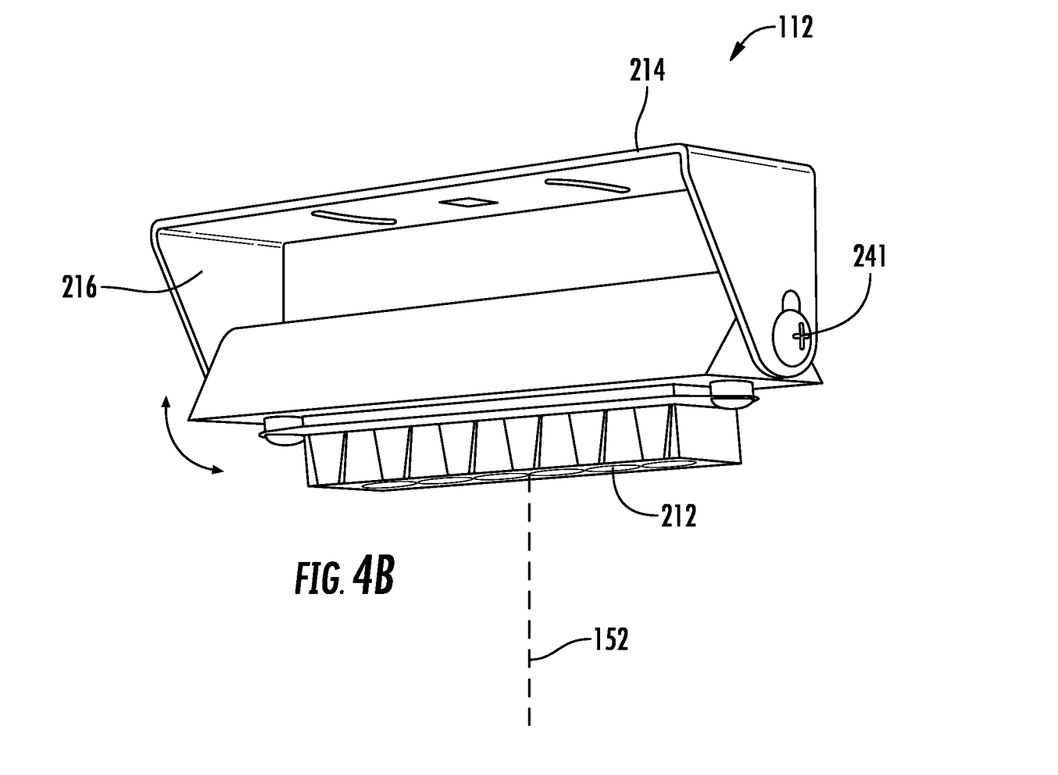

Referring to FIG. 3, another embodiment of the appliance 100 is provided. The embodiment depicted in FIG. 3 is configured substantially similarly as described with regard to FIG. 1 and FIGS. 2A-2B. FIGS. 4A-4B depict detailed embodiments of the sensor 112 in FIG. 3. The sensor 112 includes a pivot member 241 configured to change an angle of emission of the second plurality of signals 152 (e.g., depicted in FIG. 4A) relative to the first plurality of signals 151 (e.g., depicted in FIG. 4B). The sensor 112 may include a sensor array 212 configured to emit and receive signals such as described herein. The sensor array 212 may be connected to the pivot member 241 and a side wall 216 to allow the sensor array 212 to change the angle of emissions of signals based on the first operating mode and the second operating mode. The side walls 216 may be attached to a base wall 214 that attaches to the appliance 100, such as at the dispenser 114.

Figure 5:
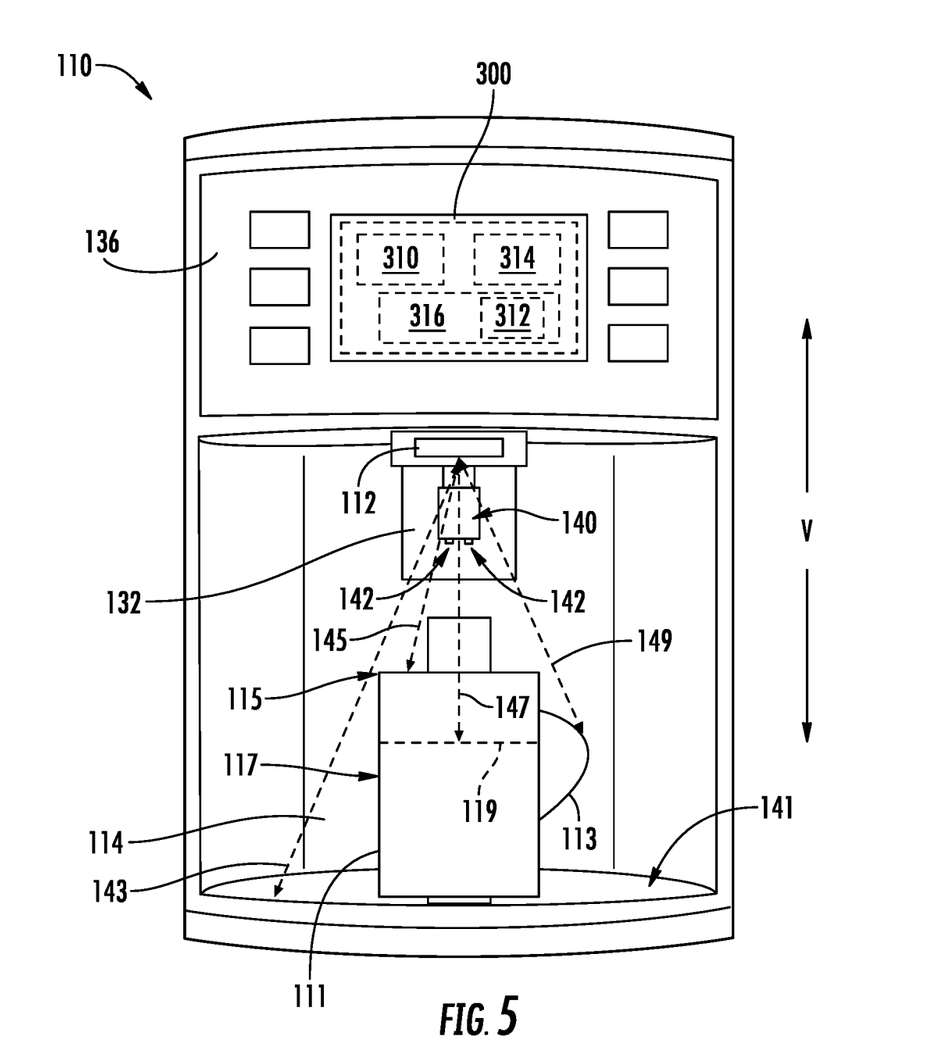
FIG. 5 provides front, elevation views of an embodiment of a dispensing assembly of the example appliance of FIG. 1.

FIG. 5 provides of a close-up front view of the dispenser 114 of dispensing assembly 110. In example embodiments, sensor 112 may be configured to detect a presence of a container 111 positioned proximate or within dispenser 114. For instance, sensor 112 may transmit one or more signals (e.g., sound waves), and receive one or more signals (e.g., reflected sound waves) indicative of container 111. In particular, the presence of a container may be detected at least in part by a comparison of a received signal (e.g., second signal 152) with a baseline signal (e.g., first signal 151). The baseline signal may be a signal received by sensor 112 that is not reflected by a container. For instance, the baseline signal may be a signal transmitted by sensor 112 that is reflected, for instance, by a bottom surface of dispenser 114. In another instance, the baseline signal is one or more of the first plurality of signals indicative of the signal transmitted by sensor 112 that is reflected by a user, the articulating plate 139 in an angled position, or the sensor 112 positioned in the first operating mode (e.g., at an angle away from vertically toward the bottom surface of the dispenser). Such signal may have an associated time interval corresponding to a particular known time interval (or range of time) for a signal transmitted by sensor 112 to return to sensor 112 in the absence of a container. When container 111 is positioned proximate dispenser 114, a different signal may be received corresponding at least in part to the signal reflected by container 111. Such signal may have a different corresponding time interval (or range of time), which may be indicative of the presence of container 111.

Dispenser 114 may be activated to initiate a flow of liquid water and/or ice into container 111 in response to an input to user interface panel 136, e.g., indicative of a request to dispense liquid water or ice. As another example, dispenser 114 may be activated to initiate a flow of liquid water and/or ice into container 111 in response to an input to user interface panel 136 and/or in response to detecting container 111 within dispenser 114. Components of appliance 100 operable to dispense liquid water and/or ice are well known and not described in detail. As an example, the controller may open a water supply line valve to dispense liquid water. As another example, the controller open an ice chute door and activate an auger motor to dispense ice. The controller may immediately operate dispenser 114 to initiate the flow of liquid water and/or ice into container 111 in response to the input at user interface panel 136. Thus, there may be no delay or a negligible delay between the input at user interface panel 136 and dispensing of liquid water and/or ice into container 111. The presence of container 111 need not be detected before dispenser 114 will dispense liquid water or ice. For instance, when a user provides an input to user interface panel 136 indicative of a request to dispense liquid water, liquid water is dispensed in conjunction with the user input even if container 111 is not detected proximate dispenser 114 by sensor 112. After initiating the flow of liquid water and/or ice into container 111, sensor 112 may then be used to detect container 111, e.g., after a suitable delay, as described in greater detail below.

Sensor 112 may also be configured to detect a level of liquid water or ice 119 in container 111 relative to a top lip 115 of container 111. In example embodiments, sensor 112 may be configured to detect the level of the liquid water or ice 119 once the presence of a container has been detected. For instance, when a container is positioned proximate dispenser 114, various signals may be received by sensor 112 indicative of the various surfaces by which the signals are reflected. For instance, a signal may be received indicative of a bottom surface of dispenser 114 (e.g., signal 143). Such signal may correspond to the baseline signal described above. Further, a signal may be received indicative of top lip 115 of container 111 (e.g., signal 145), and a signal may be received indicative of the liquid water or ice level 119 within container 111 (e.g., signal 147). One or more signals may further be received indicative of the various geometries of container 111 (e.g., signal 149). For instance, container 111 includes a handle 113 extending horizontally from container 111. As shown, signal 149 is indicative of handle 113. As another example, if a container has a geometry wherein a middle portion 117 of the container has a larger radius than the top lip of the container, a signal may be received indicative of the middle portion 117, and a different signal may be received indicative of the top lip.

In example embodiments, top lip 115 may be identified based at least in part on the first received signal by sensor 112, such that the first received signal corresponds to the surface closest to the sensor (e.g., top lip 115). In this manner, the signal indicative of top lip 115 of container 111 may be distinguished from a signal indicative of, for instance, a middle portion 117 of container 111 (e.g., handle 113), or from a signal indicative of liquid water or ice in container 111. As described above, such signals may have an associated time intervals corresponding to the time it takes for the signal to travel from sensor 112, reflect off of a surface, and be received by sensor 112. The signal indicative of top lip 115 may have the shortest associated time interval.

Once top lip 115 is identified, a liquid water or ice level 119 within container 111 may also be identified. In particular, as dispenser 114 dispenses liquid water or ice, the liquid water or ice level 119 within container 111 will rise. As the level rises, the time interval corresponding to the signal that reflects off of the liquid water or ice will decrease. The signal indicative of the liquid water or ice level 119 may be identified due at least in part to the change in the level of the liquid water or ice. In this manner, the signal indicative of the liquid water level may be distinguished, for instance, from a signal indicative of a protruding middle portion 117 of container 111. For instance, a signal indicative of the level of liquid water in container 111 (e.g., signal 147), and a signal indicative of a middle portion 117 of container 111 (e.g., signal 149) may each have time intervals that are less than the time interval associated with signal 143 (e.g., the baseline signal) but greater than the time interval associated with signal 145. In example embodiments, the signal indicative of the level of liquid water may be distinguished from the signal indicative of middle portion 117 due to the changing characteristics of the signal indicative of the liquid water level.

Once the signals indicative of top lip 115 and the liquid water or ice level 119 have been identified, the liquid water or ice level 119 may be measured relative to top lip 115. For instance, as the liquid water or ice level 119 rises, the distance between the liquid water or ice level 119 and top lip 115 decreases. When the distance between top lip 115 and the liquid water or ice level 119 falls below a threshold distance, dispenser 114 may be configured to cease dispensing liquid water or ice. The threshold distance may be, for instance, between about two centimeters (2 cm) and fifteen centimeters (15 cm). In example embodiments, the distance between top lip 115 and the liquid water or ice level 119 may be determined based on the difference between the time intervals of the respective signals. Dispenser 114 may be configured to cease dispensing liquid water or ice when the difference between the time intervals corresponds to the threshold distance.

In example embodiments, a signal indicative of ice in container 111 may be distinguished from a signal indicative of liquid water in container 111. For instance, a container may first contain an amount of ice when a user requests for liquid water to be dispensed, such that the rising liquid water level may not initially be detected by sensor 112 due at least in part to the presence of the ice in container 111. In such embodiments, when ice may be detected but not liquid water, dispenser 114 may be configured to blindly dispense liquid water for an initial time period although the liquid water level cannot initially be detected. For instance, the initial time period may be a predetermined time period, or may be determined at least in part from the determined height of container 111.

In alternative embodiments, dispenser 114 may be configured to blindly dispense liquid water until a liquid water level within container 111 may be detected. For instance, the initial time period may correspond to the amount of time until a level of liquid water in container 111 is detected. In this manner, once sensor 112 is able to detect the liquid water level, dispenser 114 may be configured to dispense liquid water in accordance with example embodiments of the present disclosure. For instance, dispenser 114 may be configured to dispense liquid water until the distance between the liquid water level and top lip falls 115 below the threshold distance.

In such embodiments, liquid water may still be dispensed even if the distance between the ice level and top lip 115 of container 111 is less than the threshold distance. For instance, if a level of ice is detected a half inch (0.5") from the top lip of container 111, liquid water may still be dispensed. As the liquid water is dispensed into container 111, the overall level of contents in container 111 does not initially rise. In particular, the ice level and the liquid water level will converge as the ice settles and the liquid water level 119 rises. Accordingly, in such embodiments, liquid water may be dispensed by dispenser 114 until the distance between the combined liquid water and ice level 119 and top lip 115 is less than the threshold distance.

Figure 6:
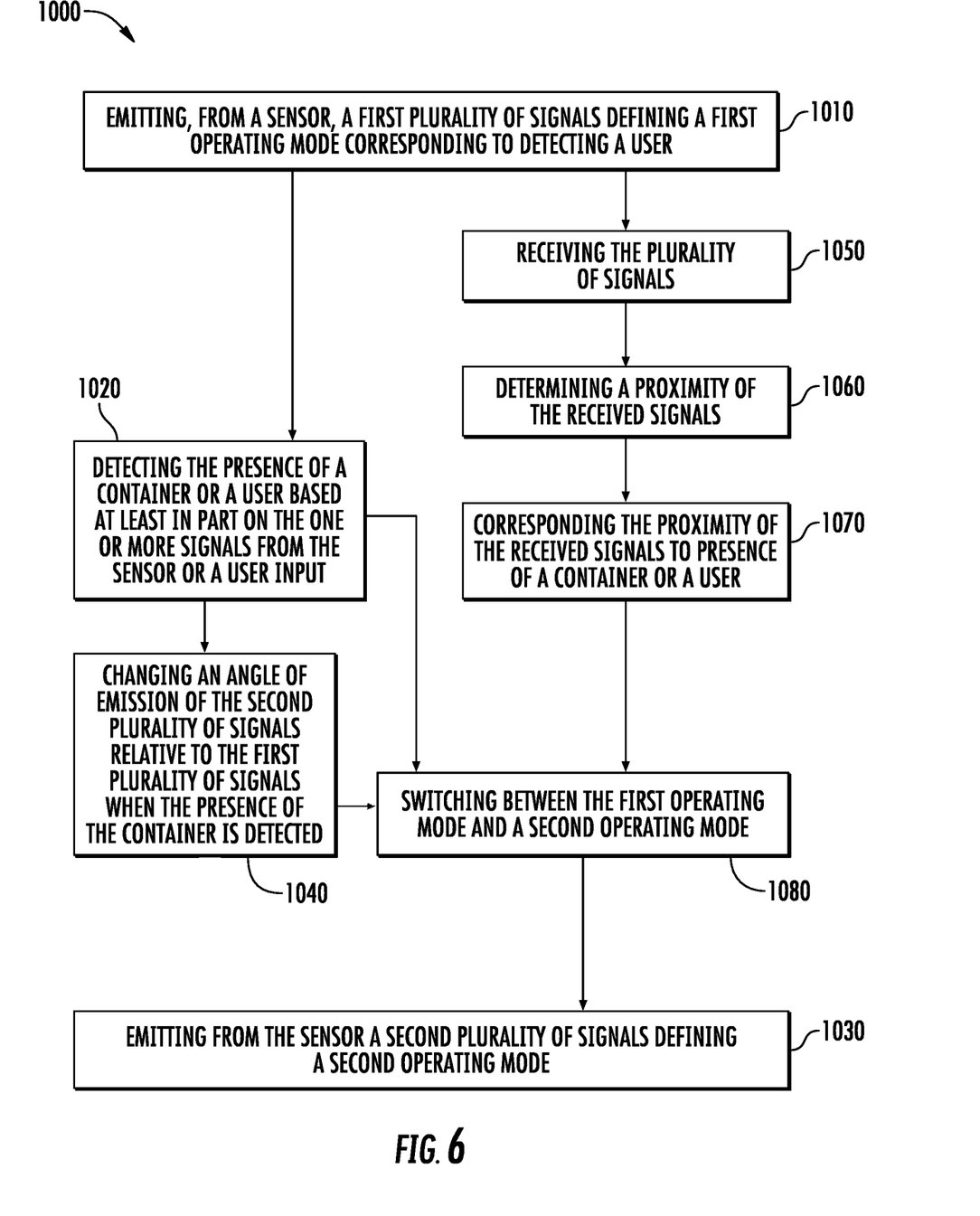
FIG. 6 illustrates a flow diagram of a method for presence detection in accordance with aspects of the present disclosure.

FIG. 6 depicts a flow diagram of an example method (1000) for operating an appliance according to example embodiments of the present disclosure. One or more steps of the method (1000) may form a method for dispensing a fluid (e.g., liquid water and/or ice). The method (1000) may be implemented by one or more computing devices, such as controller 300. As an example, method (1000) may be used in or with appliance 100 to dispense liquid water, ice, or another appropriate fluid. The controller of appliance 100 may be configured or programmed to implement method (1000). In addition, FIG. 6 depicts steps performed in a particular order for purposes of illustration and discussion. Those of ordinary skill in the art, using the disclosures provided herein, will understand that the steps of any of the methods disclosed herein may be modified, adapted, expanded, omitted, and/or rearranged in various ways without deviating from the scope of the present disclosure.

At (1010), method (1000) includes emitting, from a sensor (e.g., sensor 112), a first plurality of signals defining a first operating mode. The first operating mode includes a first scan interval, a first scan rate, or a first scan range, such as described herein, corresponding to detecting a person or user in a room or area surrounding the appliance.

At (1020), method (1000) includes detecting a container (i.e., the presence of the container) at the dispenser (e.g., within the dispensing recess 138) or detecting a user based at least in part on the one or more signals from the sensor. In various embodiments such as provided herein, the method (1000) at (1020) may include determining when a received signal is within a threshold range, such as to indicate the presence of the container within the dispensing recess in contrast to the received signal beyond the threshold range, such as to indicate the absence of the container and the reflected signal being received from beyond the dispensing recess 138 (e.g., such as indicative of presence of a user). In another embodiment, the method (1000) at (1020) may include determining a rate of change of proximity of the received signal and corresponding the rate of change to the threshold range indicative of the container at or approaching the dispensing recess 138. In still another embodiment, the method (1000) at (1020) may include detecting a container or detecting a user based on a user input.

The method (1000) includes at (1030) emitting from the sensor a second plurality of signals defining a second operating mode when the presence of the container is detected. The second operating mode includes a second scan range, such as described herein, corresponding to detecting a container at the dispensing recess.

In various embodiments, the method (1000) includes at (1040) changing an angle of emission of the second plurality of signals relative to the first plurality of signals when the presence of the container is detected. In a particular embodiment, changing the angle of emission may allow a change from emitting signals at the first operating mode to emitting signals at the second operating mode. It should be appreciated that changing the angle of emission may include changing from emitting the second plurality of signals along a vertical direction (e.g., toward the bottom portion of the dispensing recess) to up to 90 degrees, such as away or outside of the dispensing recess.

In still various embodiments, the method (1000) includes at (1050) receiving the first plurality of signals and the second plurality of signals, at (1060) determining a proximity of the received signals, and at (1070) corresponding the proximity of the received signals to presence of the container or presence of the user.

At (1080), the method (1000) includes switching between the first operating mode and the second operating mode based on one or more of detection of a container, detection of a user, or a user input. In certain embodiments, switching between the first operating mode and the second operating mode is based on the proximity of the received signals, such as described herein. In still certain embodiments, switching between the first operating mode and the second operating mode is based on when the received signal is determined to be within or beyond the threshold range, such as described herein. In a particular embodiment, the operating mode may be manually adjusted by a user via a user input at a user input panel (e.g., panel 136).

In an example embodiment, the threshold is greater than approximately 12 inches and less than approximately 14 inches. In a particular embodiment, the threshold is approximately 13.6 inches. In a still example embodiment, the first operating mode of the sensor has a sampling interval approximately 2 times to approximately 4 times greater than the second operating mode. The increased sampling interval, or time between emitting signals, may correspond to an increased scan range. In certain embodiments, the first scan range may include a user detection zone of at least approximately 14 inches. In some embodiments, the first scan range may include a user detection zone up to approximately 55 inches. The scan range may include a total distance from the sensor, and may include a vertical distance from the sensor to the articulating plate 139 and the change in angle provided by the articulating plate 139. The pivoting sensor array 212 may allow for an increased scan range, or decreased scan interval, which may allow for an increased scan resolution. In a still particular embodiment, the first operating mode includes a first scan interval of approximately 12 microseconds to approximately 40 microseconds. In another embodiment, the second operating mode includes a second scan interval of approximately 6 microseconds to approximately 10 microseconds.

Embodiments of the appliance 100, controller 300, and method (1000) provided herein allow for presence detection of a person or user in a room or area around the appliance 100. When in the presence detection mode (e.g., the first operating mode), the field of view is modified for the sensor 112, such as via deflection of the sensor and/or pivoting the sensor array in a desired direction away from the dispensing recess 138. When a user is detected in the presence detection mode, a user experience control may be implemented, including, but not limited to, activating a light (e.g., at the dispenser 114 or dispensing recess 138), activating a display or font (e.g., at the panel 136 or other screen, monitor, or user interface), sending a signal to a computing device, smartphone, security system, or other computer network, or other desired control or signal corresponding to the presence of a user near the appliance. When in the auto-fill mode or other mode corresponding to detecting a container or its contents at the dispensing recess 138 (e.g., the second operating mode), the field of view, sampling rate, resolution, or other controls of the sensor 112 are modified to allow for robust, accurate, and appropriate resolution and timing for the auto-fill mode. Particular benefits of the appliance 100, controller 300, or method 1000 may include utilizing the same sensor for the accurate and timely dispensation of fluid and determination of fluid level while also determining presence of a user further away from a container at which fluid is dispensed, in contrast to utilizing separate sensors. Accordingly, costs and complexity may be reduced, and improved functionalities may be obtained without increasing the size or space of the appliance to perform presence detection and auto-fill methods.

Embodiments of the method (1000) may further include steps for dispensing fluid into a container, such as provided herein. The method (1000) may include receiving a user input indicative of a request for liquid water or ice to be dispensed. Additionally, the user input may include switching between the first operating mode and the second operating mode. The user input may include an interaction with a user interface, a verbal command, or various other suitable user inputs. The method (1000) may include dispensing liquid water or ice. In example embodiments, liquid water or ice may be dispensed only responsive to the user input. Thus, e.g., a valve may be opened to dispense liquid water in response to the user input. As another example, an ice chute door may be opened and/or an auger motor may be activated to dispense ice in response to the user input. Dispensing of liquid water or ice is initiated without sensing or detecting a container within or proximate a dispenser. Thus, no sensor is required to sense or detect the container within or proximate a dispenser prior to dispensing liquid water or ice at the dispenser.

The method (1000) may include detecting the container proximate the dispenser. As described above, the dispenser may be configured to start dispensing liquid water or ice into the container simply in response to the user input. Method (1000) may detect the container after initiating the flow of liquid water and/or ice into the container in response to the user input. Thus, liquid water and/or ice may be flowing into the container while the presence of the container proximate the dispenser is being detected. Prior to detecting the container proximate the dispenser, method (1000) may operate under the assumption that the container is proximate the dispenser without confirming the presence of the container proximate the dispenser with a sensor until detecting the container.

The container may be detected based at least in part on one or more signals received from the sensor. In example embodiments, the sensor may be an ultrasonic transducer configured to transmit one or more high frequency sound waves, and to receive one or more reflected high frequency sound waves. The sound waves received by the sensor may have associated time intervals corresponding to an amount of time between the transmission of the sound wave and reception of the corresponding reflected sound wave. The presence of the container may be detected at least in part on a comparison between the time interval of a received sound wave and a baseline time interval associated with a baseline signal. The baseline time interval may correspond to the amount of time between transmission of a sound wave by the sensor and reception of the sound wave when no container is present proximate the dispenser.

As liquid water or ice is being dispensed into the container, the level of liquid water or ice 119 will rise. In example embodiments, the dispenser may automatically cease dispensing liquid water or ice when the level of liquid water or ice 119 reaches a certain point. For instance, method (1000) may include identifying a signal indicative of a top lip of the container. The top lip of the container may correspond to the highest point of the container. For instance, the top lip may be a rim of the container. The top lip of the container may be identified at least in part from the one or more signals received from the sensor. In particular, as described above, the top lip may correspond to signal having the shortest associated time interval.

The method (1000) may also include determining the level of liquid water or ice within the container. The level of liquid water or ice may be determined at least in part from the one or more signals received from the sensor. In example embodiments, liquid water or ice in the container may be identified based at least in part on a change in signals received from the sensor. In particular, as the liquid water or ice level rises (e.g., as liquid water or ice is being dispensed into the container), the time interval associated with the sound waves reflected by the liquid water or ice will shorten. The liquid water or ice level may be determined based on the changing time interval of such signals.

In example embodiments, the container may have a geometry wherein one or more lower portions of the container extend outwardly beyond the top lip. For instance, the container may have a handle, such as depicted in FIG. 5. In such embodiments, the sensor may receive sound waves reflected by the top lip and sound waves reflected from the lower portion. Signals received from the sensor indicative of the top lip of the container may be distinguished from signals indicative of the lower portion based at least in part on the time intervals associated with the signals. Further, signals indicative of the liquid water or ice level may be distinguished from signals indicative of the lower portion. In this manner, liquid water or ice in the container may not be confused with the lower portion of the container.

Method (1000) may further include comparing the level of liquid water or ice within the container to a threshold distance. The threshold distance may correspond to a desired amount of liquid water or ice in the container, such that the container does not overflow. In example embodiments, the threshold distance may be a distance measured relative to the bottom of the container (and/or the bottom surface of the dispensing assembly on which the container sits). For instance, the threshold distance may be a distance of six inches from the bottom of the container. In such embodiments, the threshold distance may be determined based at least in part on a determined height of the container. In further example embodiments, the threshold distance may be a distance measured relative to the top lip of the container. For instance, the threshold distance may be a distance of one inch from the top lip.

Method (1000) may include ceasing dispensing liquid water or ice when the level of liquid water or ice in the container reaches the threshold distance. In this manner, once the liquid water or ice reaches an appropriate level, no more liquid water or ice will be dispensed into the container. In alternative embodiments, the dispenser may be configured to dispense liquid water for a period of time (e.g., a dispensing period). In such embodiments, the dispensing period may be a predetermined time period, or the dispensing period may be determined based at least in part on the determined height of the container and a determined width and/or radius of the container. For instance, if the height of the container is determined to be eight inches, and the radius is determined to be two inches, a dispensing period may be determined such that an appropriate amount of liquid water or ice is dispensed into the container during the dispensing period.

Referring back to FIGS. 2A-2B and FIG. 3, embodiments of the controller 300 may include any appropriate computing device, circuitry, processor, and/or memory configured to store, process, determine, obtain, receive, or execute any one or more operations or steps, such as steps of method (1000) provided herein. It should be appreciated that the processor(s) 314 and the memory device(s) 316 may be integrated as a single component. As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory device 316 can generally include any appropriate primary storage device or secondary storage device, including, but not limited to, volatile storage memory, non-volatile storage memory, and/or other suitable memory elements, or combinations thereof.

The controller 300 may include a communications interface module 310. In various embodiments, the communications interface module 310 may include associated electronic circuitry that is used to send and receive data or signals. As such, the communications interface module 310 can be used to receive signals from the sensor(s) 112, output or transmit a visual and/or audible signal to the user (e.g., via operable communication with the panel 136), receive calibration data from the user (e.g., via panel 136), or receive, obtain, transmit, or execute any one or more steps of the method (1000) provided herein.

It should be appreciated that the communications interface module 310 can be any combination of suitable wired and/or wireless communications interfaces and, thus, can be communicatively coupled to one or more components of the appliance 100 via a wired and/or wireless connection. In example embodiments, the communications interface module 310 is configured to wirelessly communicate with an external device, such as a smartphone, tablet computing device, wearable computing device (e.g., watch, glasses, eyepiece, etc.), personal computing device (e.g., laptop or desktop computer), or vehicle including one or more computing devices. The communications interface module 310 may particularly be configured to transmit or output, via a wireless connection (e.g., Wi-Fi, Bluetooth, or other appropriate communications medium) signals corresponding to the determined volume of contents in the container.

The controller 300 may include control logic 312 stored in the memory device(s) 316. The control logic 312 may include computer-readable instructions that, when executed by the one or more processors 314, cause the one or more processors 314 to perform operations, such as outlined in one or more steps of the method (1000) provided herein. The instructions can be software written in any suitable programming language or can be implemented in hardware, including software permanently written into the memory device(s) 316. Additionally, or alternatively, the instructions can be executed in logically and/or virtually separate threads on the processor(s) 314.

As indicated above, although the present disclosure generally contemplates a dispenser configured to dispense liquid water or ice, the dispenser may be further configured to dispense various other suitable forms of liquid and/or ice. Such other forms of liquid and/or ice may be dispensed according to example embodiments of the present disclosure. Thus, it will be understood that while described above in the context of a refrigerator appliance, the present subject matter may be used in or with any suitable dispenser in alternative exemplary embodiments. For example, the present subject matter may be used to operate a water cooler, a soda fountain, etc. As another example, the dispenser may be configured to dispense solid foods, such as candy, nuts, cereal, etc. As still another example, the dispenser may be configured to dispense fluids from a dishwashing appliance, a freezer appliance, a oven and/or stove appliance, a dryer appliance, a clothes washing appliance, or other appropriate type of appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance, comprising:
   a user input panel;
   a dispenser comprising a nozzle for dispensing a fluid, and further comprising a sensor, the sensor configured to emit and receive one or more signals indicative of a distance from the sensor; and
   one or more control devices in operative communication with the user input panel, the dispenser and the sensor, the one or more control devices configured to:
      emit from the sensor a first plurality of signals defining a first operating mode, wherein the first operating mode comprises one or more of a first scan range, a first scan rate, or a first scan interval;
      switch between the first operating mode and a second operating mode based on one or more of detection of a container, detection of a user, or a user input; and
      emit from the sensor a second plurality of signals defining the second operating mode, wherein the second operating mode comprises one or more of a second scan range, a second scan rate, or a second scan interval.

2. The appliance of claim 1, wherein the one or more control devices is configured to: change an angle of emission of the second plurality of signals relative to the first plurality of signals.

3. The appliance of claim 2, wherein the one or more control devices is configured to change the angle of emission of the second plurality of signals based on one or more of detection of the container, detection of the user, or the user input.

4. The appliance of claim 1, wherein the second scan range is less than the first scan range.

5. The appliance of claim 1, wherein the one or more control devices is further configured to:
   detect the container within a dispensing recess at the dispenser based at least in part on receiving the first plurality of signals and the second plurality of signals;
   determine a proximity of received signals; and
   correspond the proximity of the received signals to presence of the container.

6. The appliance of claim 5, wherein the one or more control devices is configured to correspond the proximity of the received signals to a threshold range indicative of presence of the container, wherein the presence of the container is detected when the received signals are at or below the threshold range.

7. The appliance of claim 1, wherein the one or more control devices is configured to:
   operate the dispenser to initiate a flow of fluid into a dispensing recess through the nozzle in response to a user input at the user input panel and when the presence of the container is detected.

8. The appliance of claim 7, wherein the one or more control devices is configured to:
   receive the second plurality of signals from the sensor after operating the dispenser to initiate the flow of fluid into the dispensing recess.

9. The appliance of claim 1, wherein the first scan interval is at least approximately 2 times greater than the second scan interval.

10. The appliance of claim 1, wherein the first scan range is at least approximately 13.6 inches, and wherein the second scan range is less than approximately 13.6 inches.

11. The appliance of claim 10, wherein the one or more control devices is configured to:
   determine a proximity of received signals; and
   compare a rate of change of the proximity of the received signals.

12. The appliance of claim 1, the appliance comprising:
   an articulating plate positioned at a dispensing recess of the dispenser, wherein the articulating plate comprises an actuation structure configured to pivot the articulating plate between approximately 0 degrees to approximately 45 degrees.

13. The appliance of claim 12, wherein the one or more control devices is configured to emit, from the sensor toward the articulating plate, the first plurality of signals.

14. The appliance of claim 13, wherein the articulating plate is pivoted between approximately 0 degrees and approximately 45 degrees when emitting the first plurality of signals toward the articulating plate.

15. The appliance of claim 13, wherein the one or more control devices is configured to change an angle of emission of the second plurality of signals relative to the first plurality of signals via pivoting the articulating plate.

16. The appliance of claim 1, wherein the sensor comprises a pivot member configured to change an angle of emission of the second plurality of signals relative to the first plurality of signals.

17. A controller for an appliance, the controller comprising:
   one or more memory devices configured to store instructions that, when executed by one or more processors, causes the controller to perform operations, the operations comprising:
      emitting, from a sensor, a first plurality of signals defining a first operating mode, wherein the first operating mode comprises one or more of a first scan rate or a first scan interval;
      switching between the first operating mode and a second operating mode based on one or more of detection of a container, detection of a user, or a user input; and
      emitting, from the sensor, a second plurality of signals defining the second operating mode, wherein the second operating mode comprises one or more of a second scan rate or a second scan interval.

18. The controller of claim 17, the operations comprising:
changing an angle of emission of the second plurality of signals relative to the first plurality of signals when the presence of the container is detected.

19. The controller of claim 18, the operations comprising:
receiving the first plurality of signals and the second plurality of signals;
determining a proximity of received signals; and
corresponding the proximity of the received signals to presence of the container.

20. The controller of claim 17, wherein switching between the first operating mode and the second operating mode is based on when a received signal is determined to be within or beyond a threshold range.

\* \* \* \* \*